US012670919B2

(12) United States Patent
Chen

(10) Patent No.: US 12,670,919 B2
(45) Date of Patent: Jun. 30, 2026

(54) VOICE ACTIVATION DETECTING METHOD OF EARPHONES, EARPHONES AND STORAGE MEDIUM

(71) Applicant: GOERTEK INC., Weifang (CN)

(72) Inventor: Guoming Chen, Weifang (CN)

(73) Assignee: GOERTEK INC., Weifang (CN)

( * ) Notice: Subject to any disclaimer, the term of this patent is extended or adjusted under 35 U.S.C. 154(b) by 269 days.

(21) Appl. No.: 18/025,876

(22) PCT Filed: Oct. 29, 2020

(86) PCT No.: PCT/CN2020/124866
§ 371 (c)(1),
(2) Date: Mar. 10, 2023

(87) PCT Pub. No.: WO2022/052244
PCT Pub. Date: Mar. 17, 2022

(65) Prior Publication Data

US 2023/0352038 A1 Nov. 2, 2023

(30) Foreign Application Priority Data

Sep. 10, 2020 (CN) ......................... 202010953526.7

(51) Int. Cl.
*G10L 21/0232* (2013.01)
*G10L 25/84* (2013.01)
(Continued)

(52) U.S. Cl.
CPC .......... *G10L 21/0232* (2013.01); *G10L 25/84* (2013.01); *H04R 1/1083* (2013.01); *H04R 25/407* (2013.01); *H04R 2460/13* (2013.01)

(58) Field of Classification Search
CPC ..... G10L 21/0232; G10L 25/84; G10L 25/18; G10L 21/0208; G10L 21/0216;
(Continued)

(56) References Cited

U.S. PATENT DOCUMENTS 5,757,937 A * 5/1998 Itoh .......................... H04R 3/00 381/94.3
10,629,226 B1 * 4/2020 Tong ....................... G10L 15/08
2020/0135230 A1 * 4/2020 Tong ....................... G10L 25/78

FOREIGN PATENT DOCUMENTS

CN 109195042 A * 1/2019 ........... H04R 1/1083
CN 109920451 A * 6/2019
(Continued)

OTHER PUBLICATIONS

International Search Report from International Application No. PCT/CN2020/124866 mailed Jun. 9, 2021.

*Primary Examiner* — Andrew C Flanders
(74) *Attorney, Agent, or Firm* — Shih IP Law Group, PLLC

(57) ABSTRACT

Several embodiments of the present application discloses a voice activation detecting method of earphones, including: converting a first time-domain microphone signal into a frequency-domain microphone signal, and converting a first time-domain bone conduction signal into a frequency-domain bone conduction signal; obtaining a coherence coefficient according to the frequency-domain microphone signal and the frequency-domain bone conduction signal; obtaining spectral energy according to the frequency-domain bone conduction signal; determining that voice or noise is detected by the earphones according to the coherence coefficient and the spectral energy. The present application further discloses earphones and a storage medium.

7 Claims, 5 Drawing Sheets

(51) Int. Cl.
*H04R 1/10* (2026.01)
*H04R 25/00* (2006.01)

(58) Field of Classification Search
CPC ... G10L 25/78; H04R 1/1083; H04R 2460/13; H04R 1/1091; H04R 2201/107; H04R 2430/03; H04R 3/005; H04R 25/407; H04R 25/606; H04R 1/10; H04R 1/1033; H04R 1/1041; H04R 25/505; H04R 2460/01; H04R 2225/43
See application file for complete search history.

(56) References Cited

FOREIGN PATENT DOCUMENTS

CN 110556128 A * 12/2019 ......... G10L 21/0216
CN 110782912 A * 2/2020 ......... G10L 21/0216

* cited by examiner

VOICE ACTIVATION DETECTING METHOD OF EARPHONES, EARPHONES AND STORAGE MEDIUM

The present application claims priority to Chinese Patent Application No. 202010953526.7, titled "a voice activation detecting method of earphones, earphones and a storage medium" filed with China Patent Office on Sep. 10, 2020, the entire contents thereof are incorporated into the present application by reference.

TECHNICAL FIELD

The present application relates to a technical field of wireless communication, in particular to a voice activation detecting method of earphones, earphones and a storage medium.

DESCRIPTION OF RELATED ART

Voice enhancement is an effective method for solving noise pollution, which may extract clean voice signal from noisy voice, to reduce hearing fatigue for listeners. At present, it is widely used in digital mobile phones, Hands-free telephone systems in cars, teleconferencing, and occasions for reducing background interference for hearing impaired people etc.

In the prior art, whether the current processed signal frame belongs to a voice signal or a noise signal is determined by VAD (Voice Activated Detection), and voice features in the voice signal is extracted and whether the voice signal is noise or voice is determined according the voice features by the VAD. However, there is a problem of low recognition accuracy.

The above content is only used to help understanding the technical solution of the present application, and does not mean that the above content is recognized as the prior art.

SUMMARY

A main purpose of an embodiment of the present application is to provide a voice activation detecting method of earphones, which aims to solve a technical problem of low recognition accuracy in determining whether the voice signal is noise or voice by VAD in the prior art.

To solve the above technical problem, the embodiment of the present application provides a voice activation detecting method of earphones, including the following contents:

- converting a first time-domain microphone signal acquired by a microphone of the earphones into a frequency-domain microphone signal, and converting a first time-domain bone conduction signal acquired by a bone voiceprint sensor of the earphones into a frequency-domain bone conduction signal, wherein an acquisition time period of the first time-domain microphone signal is the same as an acquisition time period of the first time-domain bone conduction signal;
- obtaining a coherence coefficient according to the frequency-domain microphone signal and the frequency-domain bone conduction signal;
- obtaining spectral energy according to the frequency-domain bone conduction signal; and
- determining that voice or noise is detected by the earphones according to the coherence coefficient and the spectral energy.

Optionally, acquiring the coherence coefficient according to the frequency-domain microphone signal and the frequency-domain bone conduction signal includes:

- obtaining a sub-frequency-domain microphone signal of each sub-band of the frequency-domain microphone signal in a first preset frequency band;
- obtaining a sub-frequency-domain bone conduction signal of each sub-band of the frequency-domain bone conduction signal in the first preset frequency band; and
- obtaining the coherence coefficient according to the sub-frequency microphone signal of each sub-band and the sub-frequency bone conduction signal of each sub-band.

Optionally, obtaining the coherence coefficient according to the sub-frequency microphone signal of each sub-band and the sub-frequency bone conduction signal of each sub-band includes:

- obtaining microphone sub-band energy of the frequency-domain microphone signal in the first preset frequency band according to the sub-frequency microphone signal of each sub-band;
- obtaining bone conduction sub-band energy of the frequency-domain bone conduction signal in the first preset frequency band according to the sub-frequency-domain bone conduction signal of each sub-band;
- obtaining a cross correlation coefficient of each sub-band according to the sub-frequency-domain microphone signal and the sub-frequency-domain bone conduction signal corresponding to the same sub-band; and
- obtaining the coherence coefficient according to the cross correlation coefficient of each sub-band, the microphone sub-band energy and the bone conduction sub-band energy.

Optionally, obtaining spectral energy according to the spectral bone conduction signal also includes:

- obtaining a sub-frequency-domain bone conduction signal of each sub-band of the frequency-domain bone conduction signal in a second preset frequency band; and
- obtaining the spectrum energy according to each sub-frequency-domain bone conduction signal.

Optionally, determining that the voice or the noise is detected by the earphones according to the coherence coefficient and the spectral energy includes:

- if the coherence coefficient is greater than or equal to a preset coherence coefficient and the spectrum energy is greater than or equal to a preset spectrum energy, determining that the voice is detected by the earphones; and
- if the coherence coefficient is less than the preset coherence coefficient, or the spectrum energy is less than the preset spectrum energy, determining that the noise is detected by the earphones.

Optionally, after determining that the voice is detected by the earphones, the voice activation detecting method of the earphones also includes:

- performing noise elimination to the frequency-domain microphone signal and the frequency-domain bone conduction signal respectively;
- converting the noise-eliminated spectral microphone signal into a second time-domain microphone signal, and converting the noise-eliminated frequency-domain bone conduction signal into a second time-domain bone conduction signal; and mixing and processing the second time-domain microphone signal and the second time-domain bone conduction signal, and outputting the mixed signal.

Optionally, performing noise elimination to the frequency-domain microphone signal and the frequency-domain bone conduction signal respectively includes:

obtaining a historical microphone noise power spectral density and a historical bone conduction noise power spectral density of the earphones;

performing noise elimination to the frequency-domain microphone signal according to the frequency-domain microphone signal and the historical microphone noise power spectral density; and performing noise elimination to the frequency-domain bone conduction signal according to the frequency-domain bone conduction signal and the historical bone conduction noise power spectral density.

Optionally, after determining that the voice or the noise is detected by the earphones according to the coherence coefficient and the spectral energy, the voice activation detecting method of the earphones also includes:

if it is determined that the noise is detected by the earphones, obtaining the microphone noise power spectral density according to the historical microphone noise power spectral density and the frequency-domain microphone signal;

obtaining the bone conduction noise power spectral density according to the historical bone conduction noise power spectral density and the frequency-domain bone conduction signal;

updating the historical microphone noise power spectral density to the microphone noise power spectral density; and updating the historical bone conduction noise power spectral density to the bone conduction noise power spectral density.

In addition, to solve the above problem, the embodiment of the present application also provides earphones, the earphones include a microphone, a bone voiceprint sensor, a processor, a memory, and a voice activation detection program of the earphones stored on the memory and operable on the processor, wherein when the voice activation detection program of the earphones is executed by the processor, steps of the voice activation detecting method of the earphones described above are implemented.

The embodiment of the present application also provides a computer-readable storage medium, a voice activation detection program of earphones is stored on the computer-readable storage medium, when the voice activation detection program of the earphones is executed by a processor, steps of the voice activation detecting method of the earphones described above are implemented.

In the voice activation detecting method of earphones provided by the embodiment of the present application, a first time-domain microphone signal is converted into a frequency-domain microphone signal, a first time-domain bone conduction signal is converted into a frequency-domain bone conduction signal, a coherence coefficient is obtained according to the frequency-domain microphone signal and the frequency-domain bone conduction signal, frequency-domain energy is obtained according to the frequency-domain bone conduction signal, the current voice frame is determined as voice or noise according to the coherence coefficient and the frequency-domain energy, and a correlation between the microphone signal and the bone conduction signal is determined by the coherence coefficient. Here, when it is determined that the correlation between the microphone signal and the bone conduction signal is high, it is further determined that the earphones have detected the voice or the noise by referring to the spectral energy, so as to prevent a microphone signal with low energy from being determined as the voice, and to improve accuracy for determining the voice and the noise.

BRIEF DESCRIPTION OF DRAWINGS

In order to illustrate the embodiments of the present application or the technical solutions in the prior art more clearly, the drawings required to be used for the embodiments or the prior art will be briefly introduced in the following. Obviously, the drawings in the following description are merely a part of the drawings of the present application and for those of ordinary skill in the art, other drawings can also be obtained from the provided drawings without any creative effort.

DETAILED DESCRIPTIONS

It should be understood that the detailed descriptions described herein are only used to explain the present application, not to limit the present application.

The main technical solution of the embodiment of the present application is: processing audio acquired by earphones through a microphone of the earphones, converting a first time-domain microphone signal into a frequency-domain microphone signal, processing the audio acquired by the earphones through a bone voiceprint sensor of the earphones, and converting the first time-domain bone conduction signal into the frequency-domain bone conduction signal; obtaining a coherence coefficient according to the frequency-domain microphone signal and the frequency-domain bone conduction signal; obtaining spectral energy according to the frequency-domain bone conduction signal; and determining that voice or noise is detected by the earphones according to the coherence coefficient and the spectral energy.

In the prior art, there is a technical problem of low recognition accuracy in determining whether the sound signal is noise or voice by the VAD.

The embodiment of the present application provides a technical solution, in which a first time-domain microphone signal is converted into a frequency-domain microphone signal, the first time-domain bone conduction signal is converted into the frequency-domain bone conduction signal, a coherence coefficient is obtained according to the frequency-domain microphone signal and the frequency-domain bone conduction signal, frequency-domain energy is obtained according to the frequency-domain bone conduction signal, the current voice frame is determined as voice or noise according to the coherence coefficient and the frequency-domain energy, and a correlation between the microphone signal and the bone conduction signal is determined by the coherence coefficient, wherein when it is determined that the correlation between the microphone signal and the bone conduction signal is high, it is further determined that the earphones have detected the voice or the noise by referring to the spectral energy, so as to prevent a microphone signal with low energy from being determined as the voice, and to improve accuracy for determining the voice and the noise.

Figure 1:
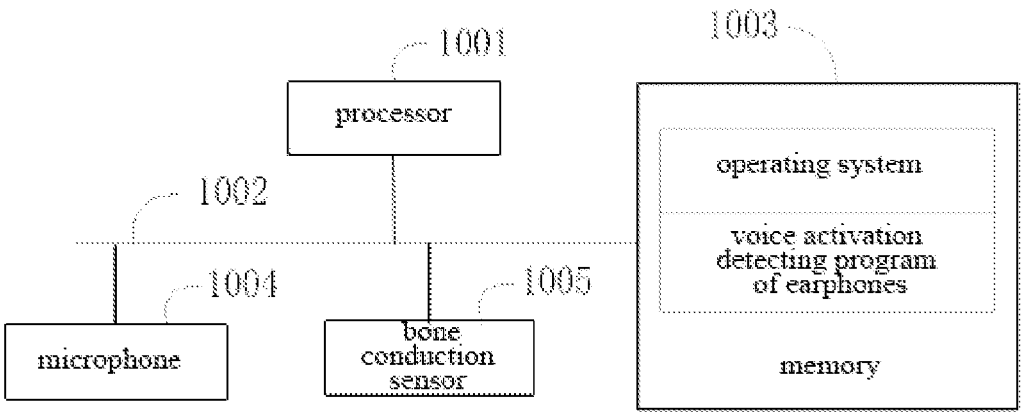
FIG. 1 is a schematic diagram of a structure of earphones in hardware operating environment involved in an embodiment of the present application.

As shown in FIG. 1, FIG. 1 is a schematic diagram of a structure of earphones in hardware operating environment involved in an embodiment of the application.

The executive body of the embodiment of the present application may be earphones. The earphones may be wired earphones or wireless earphones, such as TWS (True Wireless Stereo) Bluetooth earphones.

As shown in FIG. 1, the earphones may include: a processor 1001, such as CPU and an IC chip, a communication bus 1002, a memory 1003, a microphone 1004 and a bone voiceprint sensor 1005. Here, the communication bus 1002 is used to realize the connection and communication between these components. The memory 1003 may be a high-speed RAM memory or a non-volatile memory, such as a disk memory. Optionally, the memory 1003 may be a storage device independent of the processor 1001 described above. The microphone 1004 is used to acquire sound signal transmitted through the air, and the acquired sound signal may be used to achieve call function and noise reduction function. The bone voiceprint sensor 1005 is used to acquire vibration signal transmitted through skull, jaw, etc., and the acquired vibration signal is used to achieve noise reduction function.

Further, the earphones may also include a battery module, a touch component, an LED lamp, a sensor and a speaker. The battery module is used to supply power to the earphones. The touch component is used to achieve touch function, such as a key. The LED light is used to notify working state of the earphones, such as power on notification, charging notification, terminal connection notification, etc. The sensor may include a gravity acceleration sensor, a vibration sensor, a gyroscope, etc., which is used to detect the state of the earphones, so as to determine body movement state of a user currently wearing the earphones. The speaker may include two or more speakers. For example, each of the earphones is provided with two speakers, that is, one dynamic speaker and one moving iron speaker. The dynamic speaker has a better response in middle and low frequencies, and the moving iron speaker has a better response in middle and high frequencies. The two speakers are used at the same time. The moving iron speaker is connected to the dynamic speaker in parallel by frequency division function of the processor, so that a human ear can hear sound wave in the entire audio frequency band.

Those skilled in the art may understand that the structure of the earphones as shown in FIG. 1 does not limit the terminal, and may include more or fewer components than that shown in the FIG. 1, or some components may be combined, or have different component arrangements.

As shown in FIG. 1, the memory 1003 as a computer storage medium may include an operating system and a voice activation detection program of the earphones, and the processor 1001 may be used to call the voice activation detection program of the earphones stored in the memory 1003.

Figure 2:
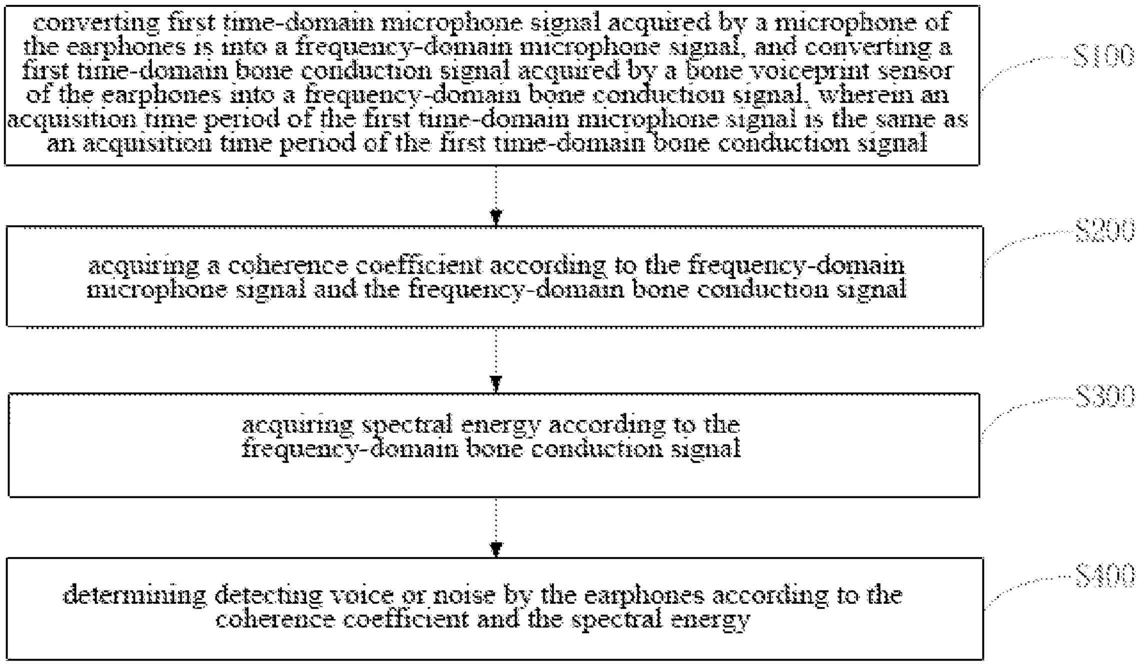
FIG. 2 is a flowchart of a first embodiment of a voice activation detecting method of the earphones of the present application.

Based on the structure of the above terminal, a first embodiment of the present application is provided. Please refer to FIG. 2, FIG. 2 is a flowchart of the first embodiment of a voice activation detecting method of the earphones of present the application. The voice activation detecting method of the earphones includes the following steps:

Step S100, converting a first time-domain microphone signal acquired by a microphone of the earphones into a frequency-domain microphone signal, and converting a first time-domain bone conduction signal acquired by a bone voiceprint sensor of the earphones into a frequency-domain bone conduction signal, wherein an acquisition time period of the first time-domain microphone signal is the same as an acquisition time period of the first time-domain bone conduction signal.

Sound waves may enter the inner ear by two routes, including air conduction and bone conduction. The air conduction means that sound waves pass from an external auditory canal to a middle ear through an auricle, and then pass to an inner ear through an ear chain. Components of its voice spectrum are relatively rich. The bone conduction means that the sound waves pass to the inner ear through vibrations of a skull, a jaw, etc. In the bone conduction, the sound waves may also be transmitted to the inner ear without passing through the outer and middle ears.

The bone voiceprint sensor includes a bone conduction microphone, and the bone voiceprint sensor only acquires the sound signal that directly contacts with the bone conduction microphone and generates vibration, but cannot acquire the sound signal transmitted through the air, thus it is not interfered by environmental noise, and is suitable for voice transmission in noisy environments. Due to the influence of process, the bone voiceprint sensor only acquires and transmits the sound signal with low frequency, which makes the sound sounds dull.

In the present embodiment, the earphones convert the first microphone time-domain signal acquired by the microphone of the earphones into the frequency-domain microphone signal in real time, and convert the first bone conduction time-domain signal acquired by the bone voiceprint processor of the earphones into the frequency-domain bone conduction signal. The earphones include the microphone and the bone voiceprint sensor. The first microphone frequency-domain signal acquired by the microphone and the first time-domain bone conduction signal acquired by the bone voiceprint sensor are acquired in the same time period, and the microphone and the bone voiceprint sensor are located in the same earphones, thus the frequency-domain signal acquired by both are the audio generated by the same sound source in the same environment of the earphones, that is, the same audio is converted into the first microphone time-domain signal after being acquired by the microphone, and is converted into the first bone conduction time-domain signal after being acquired by the bone voiceprint processor.

Optionally, the earphones may use one or more microphones to acquire the sound signal conducted through air in real time, including the ambient noise around the earphones and the sound signal conducted through air sent by the earphones wearer itself, to obtain the first time-domain microphone signal. If the earphones include multiple microphones, the microphone signals acquired by microphones respectively may be beam-forming-processed to obtain the first time-domain microphone signal.

Optionally, the earphones acquire the vibration signals conducted through the skull, the jaw, etc. in real time through the bone voiceprint sensor, to obtain the first time-domain bone conduction signal. Both of the first time-domain microphone signal and the first time-domain bone conduction signal are digital signals converted from analog signals.

The first time-domain microphone signal is converted from time-domain to frequency-domain by Fourier transform to obtain the frequency-domain microphone signal. The first time-domain bone conduction signal is converted from time-domain to frequency-domain by Fourier transform to obtain the frequency-domain bone conduction signal.

Step S200, acquiring a coherence coefficient according to the frequency-domain microphone signal and the frequency-domain bone conduction signal.

The coherence coefficient is used to reflect the correlation between the frequency-domain microphone signal and the frequency-domain bone conduction signal. The coherence coefficient is positively correlated with the correlation. The larger the coherence coefficient, the higher the correlation.

The sound signal conducted by air will inevitably be polluted by environmental noise, but the bone conduction signal acquired by the bone voiceprint sensor is not conducted by air, thus it will not be polluted by the environment. For the voice, the correlation between the microphone signal and the bone conduction signal is high, and the coherence coefficient is large; and for the noise, the microphone signal contains noise conducted by air. Thus, the correlation between the microphone signal and the bone conduction signal is low, and the coherence coefficient is small.

It may be understood that if the noise signal accounts for a large proportion of the currently acquired frequency-domain microphone signal, the correlation between the frequency-domain microphone signal and the frequency-domain bone conduction signal is low, and the coherence coefficient is small; and if the voice signal in the currently acquired frequency-domain microphone signal is pure, the correlation between the frequency-domain microphone signal and the frequency-domain bone conduction signal is high, and the coherence coefficient is large.

The earphones may obtain the coherence coefficient according to the frequency-domain microphone signal and the frequency-domain bone conduction signal.

Optionally, according to the frequency-domain microphone signal and the frequency-domain bone conduction signal, the cross power spectral density between the frequency-domain microphone signal and the frequency-domain bone conduction signal may be obtained, the power spectral density of the frequency-domain microphone signal and the power spectral density of the frequency-domain bone conduction signal may be obtained, and the coherence coefficient may be calculated according to the cross power spectral density, the power spectral density of the frequency-domain microphone signal and the power spectral density of the frequency-domain bone conduction signal.

Step S300, acquiring spectral energy according to the frequency-domain bone conduction signal.

The earphones may obtain the spectrum energy according to the frequency-domain bone conduction signal. The spectrum energy is used to measure the magnitude of the energy of the frequency-domain bone conduction signal in the low frequency band.

Step S400, determining detecting voice or noise by the earphones according to the coherence coefficient and the spectral energy.

The correlation between the frequency-domain microphone signal and the frequency-domain bone conduction signal may be determined according to the coherence coefficient. When the correlation is low, the current obtained frequency-domain microphone signal and frequency-domain bone conduction signal is determined as noise, or the audio signal detected by the earphones is determined as noise. On the contrary, it is further determined as voice or noise according to the level of spectrum energy. When the spectrum energy is low, the currently obtained spectrum microphone signal and the spectrum bone conduction signal may be determined as noise, or the audio signal detected by the earphones may be determined as noise. When the correlation is high and the spectrum energy is high, the currently obtained spectrum microphone signal and spectrum bone conduction signal may be determined as voice, or the audio signal detected by the earphones is determined as voice.

As an optional embodiment, Step S400 includes:

- if the coherence coefficient is greater than or equal to a preset coherence coefficient and the spectrum energy is greater than or equal to a preset spectrum energy, determining that voice is detected by the earphones; and
- if the coherence coefficient is less than the preset coherence coefficient, or the spectrum energy is less than the preset spectrum energy, determining that noise is detected by the earphones.

The preset coherence coefficient and the preset spectrum energy may be adjusted correspondingly according to actual demand, the microphone or bone voiceprint sensor, which may be defined by the designer. If the coherence coefficient is greater than or equal to the preset coherence coefficient, and the spectral energy is greater than or equal to the preset spectral energy, it may be determined that the audio signal currently detected by the earphones is voice, and noise elimination is performed to the spectral microphone signal and the spectral bone conduction signal. If the coherence coefficient is less than the preset coherence coefficient, or the spectrum energy is less than the preset spectrum energy, it may be determined that the audio signal detected by the current earphones is noise.

Performing noise elimination to the spectral microphone signal and the spectral bone conduction signal may include spectral subtraction, wiener filtering, MMSE least mean square error method, subspace method, wavelet transform method and neural network based noise reduction algorithm.

Optionally, after step S400, the method also includes:

If it is determined that the noise is detected by the earphones, the earphones output a mute signal.

If the coherence coefficient is less than the preset coherence coefficient, or the spectrum energy is less than the preset spectrum energy, it is determined that the currently detected audio signal is noise, and the mute signal is directly output, wherein the time-domain amplitude corresponding to the mute signal is 0. Thus, the impact of noise on uplink calls may be effectively reduced.

Figure 3:
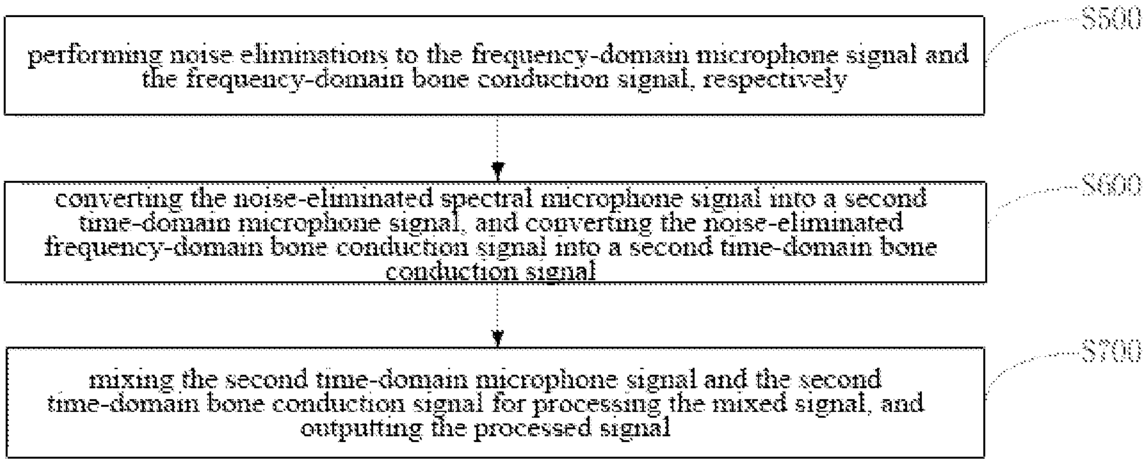
FIG. 3 is a flowchart involved after a step S400 in FIG. 2.

As an optional embodiment, please refer to FIG. 3, after step S400, the method also includes:

- Step S500, performing noise elimination to the frequency-domain microphone signal and the frequency-domain bone conduction signal respectively;
- Step S600, converting the noise-eliminated spectral microphone signal into a second time-domain microphone signal, and converting the noise-eliminated frequency-domain bone conduction signal into a second time-domain bone conduction signal; and Step S700, mixing the second time-domain microphone signal and the second time-domain bone conduction signal for processing the mixed signal, and outputting the processed signal.

The second time-domain microphone signal and the second time-domain bone conduction signal are mixed and processed to obtain a mixed sound signal, and the mixed sound signal is output for call of the uplink communication.

The noise-eliminated spectral microphone signal is converted from frequency-domain to time-domain by inverse Fourier transform to obtain a second time-domain microphone signal. The noise-eliminated spectral bone conduction signal is converted from frequency-domain to time-domain by inverse Fourier transform to obtain a second time-domain bone conduction signal.

The noise eliminations are performed to the frequency-domain microphone signal and the frequency-domain bone conduction signal, respectively; thus the environment noise is eliminated. At the same time, under strong noise condition, the low-frequency signal fidelity of the bone voiceprint sensor is far better than that of microphone, so as to improve the quality of the uplink audio signal, to improve the clarity of the low frequency signal, such that a beneficial effect of making the output uplink call having better recognition.

Optionally, high pass filtering may be used to process the second time-domain microphone signal, and low pass filtering may be used to process the second time-domain bone conduction signal. The processed second time-domain microphone signal and the processed second time-domain bone conduction signal are mixed, and a mixed sound signal is obtained and output.

High pass filtering is used to process the second time-domain microphone signal, to block and weaken the signal in the low frequency band of the second time-domain microphone signal. Low pass filtering is used to process the second time-domain bone conduction signal, to block and weaken the signal in the high frequency end of the second time-domain bone conduction signal. The processed second time-domain microphone signal and the processed second time-domain bone conduction signal are mixed, and a mixed sound signal is obtained and output for uplink communication.

In the present embodiment, a first time-domain microphone signal is converted into a frequency-domain microphone signal, a first time-domain bone conduction signal is converted into a frequency-domain bone conduction signal, a coherence coefficient is obtained according to the frequency-domain microphone signal and the frequency-domain bone conduction signal, frequency-domain energy is obtained according to the frequency-domain bone conduction signal, the current voice frame is determined as voice or noise according to the coherence coefficient and the frequency-domain energy, and a correlation between the microphone signal and the bone conduction signal is determined by the coherence coefficient. Here, when it is determined that the correlation between the microphone signal and the bone conduction signal is high, it is further determined that the earphones have detected the voice or the noise by referring to the spectral energy, so as to prevent a microphone signal with low energy from being determined as the voice, and to improve accuracy for determining the voice and the noise.

Figure 4:
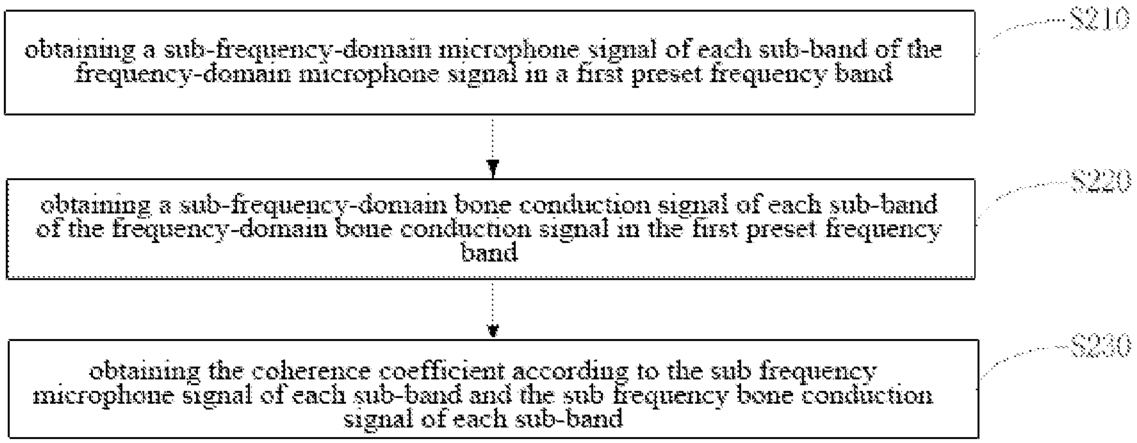
FIG. 4 is a flowchart of a second embodiment of the voice activation detecting method of the earphones of the present application.

Based on the above first embodiment, please refer to FIG. 4, FIG. 4 is a flowchart of a second embodiment of the voice activation detecting method of the earphones of the present application. Step S200 includes:

Step S210, obtaining a sub-frequency-domain microphone signal of each sub-band of the frequency-domain microphone signal in a first preset frequency band;

Step S220, obtaining a sub-frequency-domain bone conduction signal of each sub-band of the frequency-domain bone conduction signal in the first preset frequency band; and Step S230, obtaining the coherence coefficient according to the sub-frequency microphone signal of each sub-band and the sub-frequency bone conduction signal of each sub-band.

After Fourier transform of the first time-domain microphone signal and the first time-domain bone conduction signal, a spectrum with a preset bandwidth may be obtained, such as 0-8000 Hz. The bandwidth may be divided into sub-bands with equal frequency intervals. For example, the bandwidth of 0-8000 Hz may be divided into 128 sub-bands, and each sub-band is 62.5 Hz. The first preset frequency band is a part of the preset bandwidth, which may be provided according to requirements or effects, such as 0-4000 Hz, with a total of 64 sub-bands.

A sub-frequency-domain microphone signal of each sub-band of the frequency-domain microphone signal in the first preset frequency band is obtained; a sub-frequency-domain bone conduction signal of each sub-band of the frequency-domain bone conduction signal in the first preset frequency ban is obtained. And the coherence coefficient is obtained according to the sub-frequency microphone signal of each sub-band and the sub-frequency bone conduction signal of each sub-band.

Figure 5:
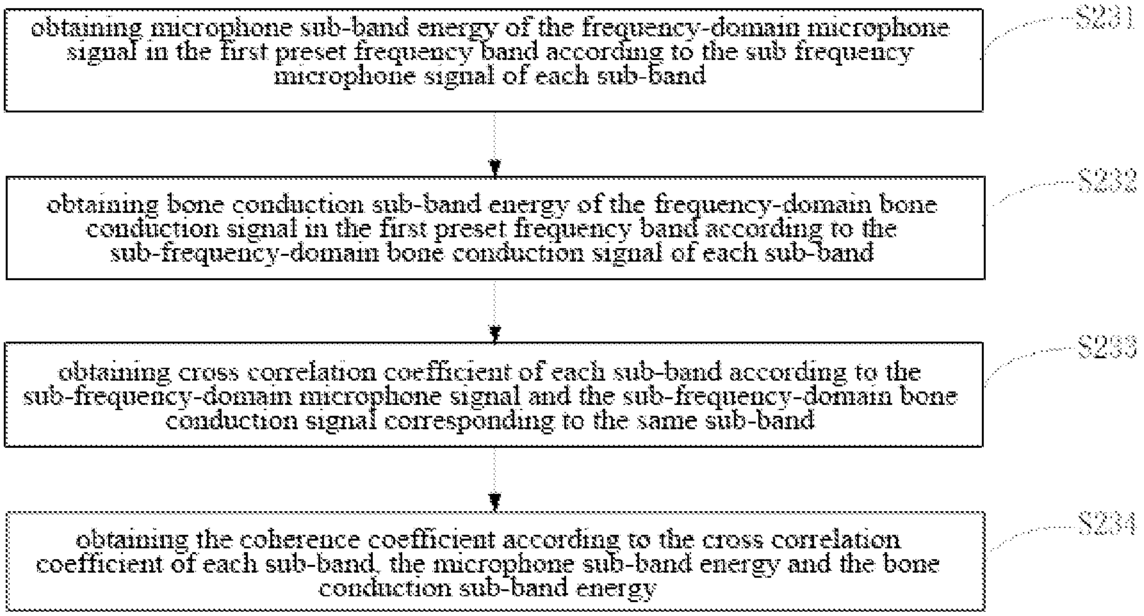
FIG. 5 is a detailed flowchart of a step S230 in FIG. 4.

Optionally, as an embodiment, please refer to FIG. 5, wherein step S230 includes:

Step S231, obtaining microphone sub-band energy of the frequency-domain microphone signal in the first preset frequency band according to the sub-frequency microphone signal of each sub-band;

Step S232, obtaining bone conduction sub-band energy of the frequency-domain bone conduction signal in the first preset frequency band according to the sub-frequency-domain bone conduction signal of each sub-band;

Step S233, obtaining cross correlation coefficient of each sub-band according to the sub-frequency-domain microphone signal and the sub-frequency-domain bone conduction signal corresponding to the same sub-band; and Step S234, obtaining the coherence coefficient according to the cross correlation coefficient of each sub-band, the microphone sub-band energy and the bone conduction sub-band energy.

The earphones obtain the microphone sub-band energy of the frequency-domain microphone signal in the first preset frequency band according to the sub-frequency microphone signal of each sub-band. Further, the microphone sub-band energy in the first preset frequency band is equal to the square sums of the modulus of the sub-frequency-domain microphone signals of each sub-band.

The earphones obtain the bone conduction sub-band energy of the frequency-domain bone conduction signal in the first preset frequency band according to the sub-frequency-domain bone conduction signal of each sub-band. Further, the bone conduction sub-band energy in the first preset frequency band is equal to the square sums of the modulus of the sub bone conduction signal of each sub-band.

The earphones obtain the cross correlation coefficient of each sub-band in the first preset frequency band according to the sub-frequency-domain microphone signal and the sub-frequency-domain bone conduction signal corresponding to the same sub-band. Furthermore, the cross correlation coefficient of the sub-bands is equal to the product of the corresponding sub-frequency-domain microphone signal and the corresponding sub-frequency-domain bone conduction signal.

The earphones obtain the coherence coefficient according to the cross correlation coefficient of each sub-band, the microphone sub-band energy and the bone conduction sub-band energy. Further, the earphones may obtain the sum of the cross correlation coefficient of the first preset frequency band according to the cross correlation coefficient of each sub-band, wherein the sum of the cross correlation coefficients is equal to the sum of the cross correlation coefficient of each sub-band. The correlation coefficient of earphones may be obtained according to the sum of cross correlation coefficients, the microphone band energy and the bone conduction sub-band energy.

Furthermore, the coherence coefficient is equal to a ratio of the sum of the cross correlation coefficients to the square root of the microphone sub-band energy and the bone conduction sub-band energy.

Optionally, the coherence coefficient satisfies the following formula:

$$\Phi = \frac{\sum_{k=1}^{64}(Y_1(k)*Y_2(k))}{\sqrt{\sum_{k=1}^{64}|Y_1(k)|^2*\sum_{k=1}^{64}|Y_2(k)|^2}}$$

This formula is taken the first preset frequency band being 0-4000 Hz and with 64 sub-bands as an example, wherein $\Phi$ is the coherence coefficient, k is the sub-band number of the first preset frequency band, and $Y_1(k)$ is the corresponding sub-frequency-domain microphone signal when the sub-band number is k, and $Y_2(k)$ is the sub-frequency-domain bone conduction signal when the sub-band number is k.

In the present embodiment, the sub-frequency-domain microphone signal and the sub-frequency-domain bone conduction signal corresponding to each sub-band in the first preset frequency band is obtained, the coherence coefficient according to the sub-frequency-domain microphone signal and the sub-frequency-domain bone conduction signal of each sub-band is obtained, an appropriate first preset frequency band is provided, the correlation between the sub-frequency-domain microphone signal and the sub-frequency bone conduction signal is obtained by combining the sub-frequency-domain microphone signal and the sub-frequency-domain bone conduction signal of each sub-band, and the coherence coefficient is obtained according to the correlation between the sub-frequency-domain microphone signal and the sub-frequency-domain bone conduction signal of each sub-band. Thus, the coherence coefficient is more statistically significant and the coherence coefficient obtained is more accurate, which has a beneficial effect for determining whether the noise or the voice is more conform to reality.

Figure 6:
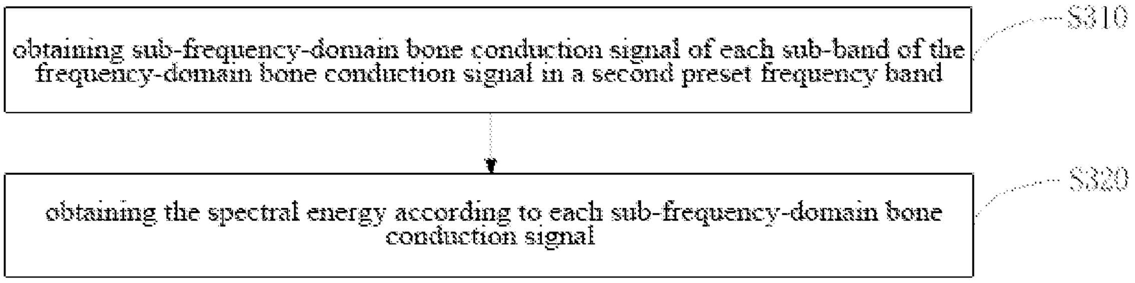
FIG. 6 is a flowchart of a third embodiment of the voice activation detecting method of the earphones of the present application.

Based on any of the above embodiments, please refer to FIG. 6, FIG. 6 is a flowchart of a third embodiment of the voice activation detecting method of the earphones of the present application. Step S300 includes:

Step S310, obtaining sub-frequency-domain bone conduction signal of each sub-band of the frequency-domain bone conduction signal in a second preset frequency band; and Step S320, obtaining the spectral energy according to each sub-frequency-domain bone conduction signal.

In the present embodiment, the second preset frequency band may be selected from the same preset bandwidth in the second embodiment, such as 0-8000 Hz. The second preset frequency band is a part of the preset bandwidth, which may be provided according to the demand or actual effect, such as 0-2000 Hz, with a total of 32 sub-bands.

The sub-frequency-domain bone conduction signal of each sub-band of the frequency-domain bone conduction signal in a second preset frequency band is obtained, and the spectrum energy according to the sub-frequency-domain bone conduction signal of each sub-band is obtained. Further, the spectral energy is equal to the square sum of the modulus of the sub-frequency-domain bone conduction signals of each sub-band. Further, the sub-frequency-domain energy of each sub-band may be obtained according to the sub-frequency-domain bone conduction signal, and the frequency-domain energy may be obtained according to the sub-frequency-domain energy of each sub-band, wherein the sub-frequency-domain energy of the sub-band is equal to the square of the modulus of the sub-frequency-domain bone conduction signal of the sub-band, and the frequency-domain energy is equal to the sum of the sub-frequency-domain energy of each sub-band.

Optionally, the frequency-domain energy satisfies the following formula:

$$E_g = \sum_{k=1}^{32}|Y_2(k)|^2$$

Take the first preset frequency band being 0-2000 Hz with 32 sub-bands as an example. $E_g$ is the spectral energy, k is the sub-band number of the first preset frequency band, and Y2 (k) is the corresponding sub-frequency-domain bone conduction signal when the sub-band number is k.

In the present embodiment, the sub-frequency-domain bone conduction signal of each sub-band in the second preset frequency band is obtained, the spectrum energy is obtained according to the sub-frequency-domain bone conduction signals of each sub-band, and a suitable second preset frequency band is provided, the spectrum energy is obtained according to the sub-frequency-domain bone conduction signals of each sub-band in the low frequency band. Thus, the obtaining of the spectrum energy has more practical meaning, at the same time, the magnitude of the spectrum energy is reflected more accurately, thus the voice recognition is more accurate. Furthermore, when the frequency of the sound signal is low, the coherence coefficient of the frequency-domain microphone signal and the frequency-domain bone conduction signal may also be large, which is easy to cause the noise to be misjudged into voice, and a beneficial effect of effectively eliminate the misjudgment when the energy is low when combining the spectrum energy.

Figure 7:
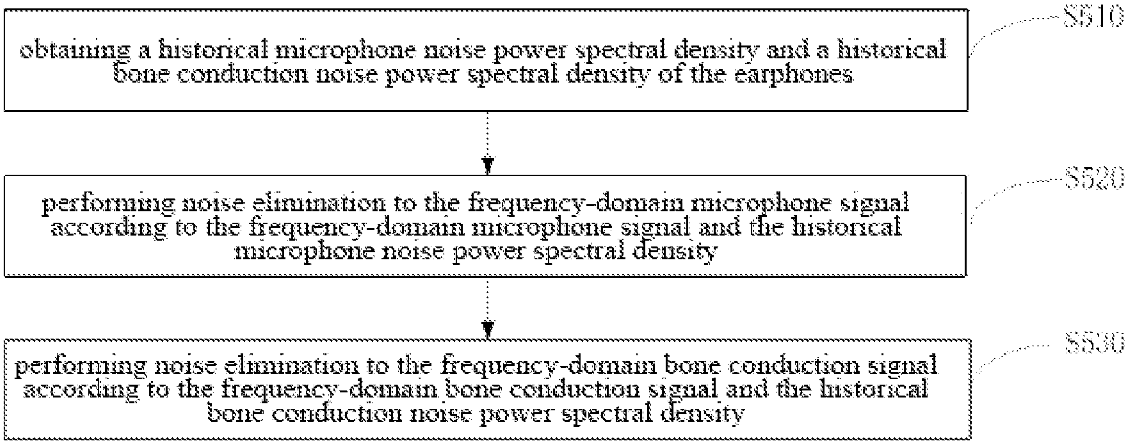
FIG. 7 is a flowchart of a fourth embodiment of the voice activation detecting method of the earphones of the present application.

Based on any of the above embodiments, please refer to FIG. 7, FIG. 7 is a flowchart of a fourth embodiment of the voice activation detecting method of the earphones of the present application. Step S500 includes:

Step S510, obtaining a historical microphone noise power spectral density and a historical bone conduction noise power spectral density of the earphones;

Step S520, performing noise elimination to the frequency-domain microphone signal according to the frequency-domain microphone signal and the historical microphone noise power spectral density; and Step S530, performing noise elimination to the frequency-domain bone conduction signal according to the frequency-domain bone conduction signal and the historical bone conduction noise power spectral density.

The earphones store the microphone noise signal and bone conduction noise signal detected last time. The historical microphone noise power spectral density may be the last microphone noise signal recognized by the earphones, and the historical bone conduction noise power spectral density may be the last bone conduction noise signal recognized by the earphones.

The earphones may eliminate and enhance the spectral microphone signal according to the spectral microphone signal and the historical microphone noise power spectral density. Further, the corresponding gain function may be obtained according to the frequency-domain microphone signal and the historical microphone noise power spectral density, and the noise of the frequency-domain microphone signal may be eliminated and enhanced according to the gain function and the spectral microphone signal.

The earphones may eliminate and enhance the spectral bone conduction signal according to the spectral bone conduction signal and the historical bone conduction noise spectral density. Furthermore, the corresponding gain function may be obtained according to the frequency-domain bone conduction signal and the historical bone conduction noise spectral density, and the noise of the frequency-domain bone conduction signal may be eliminated and enhanced according to the gain function and the spectrum bone conduction signal.

Optionally, the elimination and enhancement of the frequency-domain microphone signal or the frequency-domain bone conduction signal meet the following formula:

$$\hat{Y}_t(k) = Y_t(k)H_t(k) = Y_t(k)\sqrt{1 - \lambda\left(\frac{1}{\gamma_t(k)}\right)} \text{ wherein,}$$

$$\gamma_t(k) = \frac{|Y_t(k)|^2}{P_n(k, t-1)}$$

wherein, $\hat{\gamma}_t$(k) is the noise-eliminated frequency-domain microphone signal or the noise-eliminated frequency-domain bone conduction signal; $H_t$(k) is the gain function; $\gamma_t$(k) is the posterior signal-to-noise ratio; λ Is the over minus factor, which is a constant, such as 0.9; $P_n$(k,t−1) is the historical microphone noise power spectral density or the historical bone conduction noise power spectral density.

In the present embodiment, the historical microphone noise power spectral density and the historical bone conduction noise power spectral density is obtained, the frequency-domain microphone signal is eliminated and enhanced according to the frequency-domain microphone signal and the historical microphone noise power spectral density, and the frequency-domain bone conduction signal is eliminated and enhanced according to the frequency-domain bone conduction signal and the historical bone conduction noise power spectral density, the current sound signal is eliminated according to the noise signal detected last time, and the noise of the sound signal is eliminated according to the characteristics of the environmental noise and bone voiceprint sensor. Thus, there is a better noise reduction effect. Under the condition of strong noise, the fidelity of the low frequency signal of the bone voiceprint sensor is far better than that of the low frequency signal of the microphone, so as to improve the quality of the uplink audio signal and to improve the clarity of the low frequency signal, which has a beneficial effect of making the output uplink call have better recognition.

Figure 8:
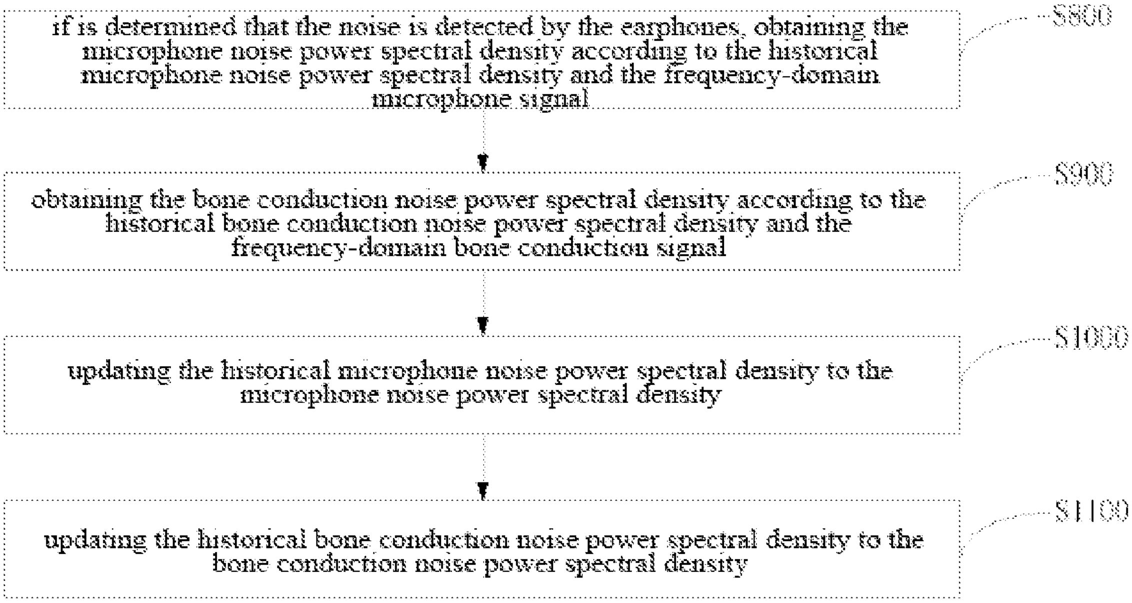
FIG. 8 is a flowchart of a fifth embodiment of the voice activation detecting method of the earphones of the present application.

Based on the above fourth embodiment, please refer to FIG. 8, FIG. 8 is a flowchart of a fifth embodiment of the voice activation detecting method of the earphones of the present application. After step S400, the method also includes:

Step S800, if is determined that the noise is detected by the earphones, obtaining the microphone noise power spectral density according to the historical microphone noise power spectral density and the frequency-domain microphone signal;

Step S900, obtaining the bone conduction noise power spectral density according to the historical bone conduction noise power spectral density and the frequency-domain bone conduction signal;

Step S1000, updating the historical microphone noise power spectral density to the microphone noise power spectral density; and Step S1100, updating the historical bone conduction noise power spectral density to the bone conduction noise power spectral density.

When the coherence coefficient is less than the preset coherence coefficient, or the spectrum energy is less than the preset spectrum energy, the earphones detect the noise, the microphone noise power spectral density is obtained according to the historical microphone noise power spectral density and the frequency-domain microphone signal, and the bone conduction noise power spectral density is obtained according to the historical bone conduction noise power spectral density and the spectral bone conduction signal.

Further, the microphone noise power spectral density is obtained according to the square of the modulus of the frequency-domain microphone signal and the historical microphone noise power spectral density; and the bone conduction noise power spectral density is obtained according to the square of the modulus of the frequency-domain bone conduction signal and the historical bone conduction noise power spectral density.

Optionally, the microphone noise power spectral density satisfies the following formula:

$$P_{n1}(k, t) = \beta * P_{n1}(k, t-1) + (1-\beta) * |Y_1(k, t|^2$$

Here, $P_{n1}$(k,t) is the microphone noise power spectral density; $P_{n1}$ (k,t−1) is the historical microphone noise power spectral density; β Is the iteration factor, which is a constant, such as 0.9; t is the voice frame number; and K is the sub-band serial number.

Optionally, the bone conduction noise power spectral density satisfies the following formula:

$$P_{n2}(k, t) = \beta * P_{n2}(k, t-1) + (1-\beta) * |Y_2(k, t)|$$

Here, $P_{n2}$(k,t) is the bone conduction noise power spectral density; $P_{n1}$(k,t−1) is the historical bone conduction noise power spectral density; β Is the iteration factor, which is a constant, such as 0.9; T is the voice frame number; and K is the sub-band serial number.

After obtaining the bone conduction noise power spectral density and the microphone noise power spectral density, the historical microphone noise power spectral density is updated to the microphone noise power spectral density, and the historical bone conduction noise power spectral density is updated to the bone conduction noise power spectral density.

In the present embodiment, when the audio signal acquired currently by the earphones is noise, the historical microphone noise power spectral density and the historical bone conduction noise power spectral density are acquired, the microphone noise power spectral density is obtained according to the frequency-domain microphone signal and historical microphone noise power spectral density, the bone conduction noise power spectral density is obtained according to the frequency-domain bone conduction signal and the historical bone conduction noise power spectral density, and the historical microphone noise power spectral density and the historical bone conduction noise power spectral density are updated, and the noise signal are updated in time, so as to eliminate or enhance the current noise according to the change of environmental noise, so as have a beneficial effect to better reduce of noise.

In addition, the embodiment of the present application also provides earphones. The earphones include a microphone, a bone voiceprint sensor, a processor, a memory, and a voice activation detection program of the earphones stored on the memory and operable on the processor, wherein when the voice activation detection program of the earphones is executed by the processor, steps of the voice activation detecting method of the earphones described above are achieved.

The embodiment of the present application also provides a computer-readable storage medium, a voice activation detection program of earphones is stored on the computer-readable storage medium, when the voice activation detection program of the earphones is executed by a processor, steps of the voice activation detecting method of the earphones described above are achieved.

The serial number of the above embodiments of the present application is only for description and does not represent the advantages and disadvantages of the embodiments.

It should be noted that, in this paper, the terms "comprise", "include" or any other variant thereof are intended to cover non-exclusive inclusion, so that a process, method, article or device including a series of elements not only includes those elements, but also includes other elements not explicitly listed, or also includes elements inherent to such process, method, article or device. Without further restrictions, the element defined by the statement "including one . . . " does not exclude the existence of another identical element in the process, method, article or device including the element.

Through the above description of the embodiments, those skilled in the art may clearly understand that the above embodiments maybe implemented by means of software and the necessary general hardware platform, or by means of hardware, but in many cases the former is a better implementation. Based on this understanding, the technical solution of the present application in essence or the part that contributes to the prior art can be embodied in the form of a software product, which is stored in a computer-readable storage medium (such as ROM/RAM, magnetic disc, optical disc) as described above, a plurality of instructions are included to enable earphones (which can be a mobile phone, a computer, a server, an air conditioner, or a network device, etc.) to execute the methods described in various embodiments of the present application.

The above embodiments are only preferred embodiments of the present application, and do not limit the scope of the patent of the present application. Any equivalent structure or equivalent process transformation made by using the description of the present application and the accompanying drawings, or direct or indirect application in other related technical fields, are similarly included in the scope of patent protection of the present application.

What is claimed is:

1. A voice activation detecting method of earphones, comprising:

converting a first time-domain microphone signal acquired by a microphone of the earphones into a frequency-domain microphone signal, and converting a first time-domain bone conduction signal acquired by a bone voiceprint sensor of the earphones into a frequency-domain bone conduction signal, wherein an acquisition time period of the first time-domain microphone signal is the same as an acquisition time period of the first time-domain bone conduction signal;

obtaining a coherence coefficient according to the frequency-domain microphone signal and the frequency-domain bone conduction signal;

obtaining spectral energy according to the frequency-domain bone conduction signal; and determining that voice or noise is detected by the earphones according to the coherence coefficient and the spectral energy, wherein determining that the voice or the noise is detected by the earphones according to the coherence coefficient and the spectral energy comprises:

if the coherence coefficient is greater than or equal to a preset coherence coefficient and the spectrum energy is greater than or equal to a preset spectrum energy, determining that the voice is detected by the earphones; and if the coherence coefficient is less than the preset coherence coefficient, or the spectrum energy is less than the preset spectrum energy, determining that the noise is detected by the earphones, wherein after determining that the voice is detected by the earphones, the voice activation detecting method of the earphones further comprises:

performing noise eliminations to the frequency-domain microphone signal and the frequency-domain bone conduction signal, respectively;

converting the noise-eliminated spectral microphone signal into a second time-domain microphone signal, and converting the noise-eliminated frequency-domain bone conduction signal into a second time-domain bone conduction signal; and mixing and processing the second time-domain microphone signal and the second time-domain bone conduction signal and outputting a mixed signal, wherein performing noise eliminations to the frequency-domain microphone signal and the frequency-domain bone conduction signal, respectively, comprises:

obtaining a historical microphone noise power spectral density and a historical bone conduction noise power spectral density of the earphones;

performing noise elimination to the frequency-domain microphone signal according to the frequency-domain microphone signal and the historical microphone noise power spectral density; and performing noise elimination to the frequency-domain bone conduction signal according to the frequency-domain bone conduction signal and the historical bone conduction noise power spectral density, and wherein the elimination and enhancement of the frequency-domain microphone signal or the frequency-domain bone conduction signal meet the following formula:

$$\hat{Y}_t(k) = Y_t(k)H_t(k) = Y_t(k)\sqrt{1 - \lambda\left(\frac{1}{\gamma_t(k)}\right)},$$

$$\gamma_t(k) = \frac{|Y_t(k)|^2}{P_n(k, t-1)}, \text{ wherein } \hat{\gamma}_t(k)$$

is noise-eliminated frequency-domain microphone signal or the noise-eliminated frequency-domain bone conduction signal; $H_t(k)$ is gain function; $\gamma_t(k)$ is posterior signal-to-noise ratio; $\lambda$ is over minus factor, which is a constant; and $P_n(k,t-1)$ is historical microphone noise power spectral density or historical bone conduction noise power spectral density.

2. The voice activation detecting method of earphones according to claim 1, wherein acquiring the coherence coefficient according to the frequency-domain microphone signal and the frequency-domain bone conduction signal comprises:

obtaining a sub-frequency-domain microphone signal of each sub-band of the frequency-domain microphone signal in a first preset frequency band;

obtaining a sub-frequency-domain bone conduction signal of each sub-band of the frequency-domain bone conduction signal in the first preset frequency band; and obtaining the coherence coefficient according to the sub-frequency microphone signal of each sub-band and the sub-frequency bone conduction signal of each sub-band.

3. The voice activation detecting method of earphones according to claim 2, wherein obtaining the coherence coefficient according to the sub-frequency microphone signal of each sub-band and the sub-frequency bone conduction signal of each sub-band comprises:

obtaining microphone sub-band energy of the frequency-domain microphone signal in the first preset frequency band according to the sub-frequency microphone signal of each sub-band;

obtaining bone conduction sub-band energy of the frequency-domain bone conduction signal in the first preset frequency band according to the sub-frequency-domain bone conduction signal of each sub-band;

obtaining a cross correlation coefficient of each sub-band according to the sub-frequency-domain microphone signal and the sub-frequency-domain bone conduction signal corresponding to the same sub-band; and obtaining the coherence coefficient according to the cross correlation coefficient of each sub-band, the microphone sub-band energy and the bone conduction sub-band energy.

4. The voice activation detecting method of earphones according to claim 1, wherein obtaining spectral energy according to the frequency-domain bone conduction signal also comprises:

obtaining a sub-frequency-domain bone conduction signal of each sub-band of the frequency-domain bone conduction signal in a second preset frequency band; and obtaining the spectrum energy according to each sub-frequency-domain bone conduction signal.

5. The voice activation detecting method of earphones according to claim 1, wherein after determining that the voice or the noise is detected by the earphones according to the coherence coefficient and the spectral energy, the voice activation detecting method of the earphones further comprises:

if it is determined that the noise is detected by the earphones, obtaining a microphone noise power spectral density according to the historical microphone noise power spectral density and the frequency-domain microphone signal;

obtaining a bone conduction noise power spectral density according to the historical bone conduction noise power spectral density and the frequency-domain bone conduction signal;

updating the historical microphone noise power spectral density to the microphone noise power spectral density; and updating the historical bone conduction noise power spectral density to the bone conduction noise power spectral density.

6. An earphone, the earphone comprises a microphone, a bone voiceprint sensor, a processor, a memory, and a voice activation detection program of earphones stored on the memory and operable on the processor, wherein the voice activation detection program of the earphone, when executed by the processor, implements steps of the voice activation detection method of the earphones of claim 1.

7. A non-transitory computer-readable storage medium having a voice activation detection program of earphones stored thereon, wherein the voice activation detection program of the earphones, when executed by a processor, implements steps of the voice activation detection method of the earphones of claim 1.

* * * * *